US008199426B2

(12) United States Patent
Hendriks

(10) Patent No.: US 8,199,426 B2
(45) Date of Patent: Jun. 12, 2012

(54) METHOD AND SYSTEM FOR PROVIDING HARD DISK SHROUDS WITH AERODYNAMIC FENCES FOR SUPPRESSING FLOW INDUCED DISK EXCITATION

(75) Inventor: Ferdinand Hendriks, Morgan Hill, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 928 days.

(21) Appl. No.: 12/054,244

(22) Filed: Mar. 24, 2008

(65) Prior Publication Data

US 2009/0237836 A1    Sep. 24, 2009

(51) Int. Cl.
  *G11B 33/14*    (2006.01)
(52) U.S. Cl. .................... 360/97.03; 360/97.02
(58) Field of Classification Search ...... 360/97.01–97.03
  See application file for complete search history.

(56) References Cited

U.S. PATENT DOCUMENTS

| | | | |
|---|---|---|---|
| 4,583,213 A | | 4/1986 | Bracken et al. |
| 5,636,082 A | * | 6/1997 | Shibuya et al. ............ 360/97.02 |
| 5,696,649 A | * | 12/1997 | Boutaghou ................ 360/97.03 |
| 6,125,003 A | | 9/2000 | Tsuda et al. |
| 6,172,843 B1 | * | 1/2001 | Genheimer et al. ....... 360/97.01 |
| 6,208,484 B1 | | 3/2001 | Voights |
| 6,229,304 B1 | | 5/2001 | Guzik |
| 6,271,987 B1 | * | 8/2001 | Allsup et al. .............. 360/97.03 |
| 6,462,901 B1 | * | 10/2002 | Tadepalli ................... 360/97.03 |
| 6,487,038 B1 | | 11/2002 | Izumi et al. |
| 6,728,062 B1 | * | 4/2004 | Ou-Yang et al. .......... 360/97.02 |
| 6,801,387 B1 | * | 10/2004 | Rahman ..................... 360/97.03 |
| 7,072,140 B2 | * | 7/2006 | Asano et al. .............. 360/97.02 |
| 7,106,553 B2 | * | 9/2006 | Kim ........................... 360/97.02 |
| 7,133,249 B2 | | 11/2006 | Miyajima |
| 7,224,551 B1 | | 5/2007 | Ou-Yang et al. |
| 7,312,950 B2 | * | 12/2007 | Voights et al. ............. 360/97.02 |
| 7,457,078 B2 | * | 11/2008 | Fukaya et al. ............. 360/97.02 |
| 2002/0135933 A1 | * | 9/2002 | Harrison et al. ........... 360/97.02 |
| 2003/0156351 A1 | * | 8/2003 | Voights et al. ............. 360/97.02 |
| 2003/0156352 A1 | * | 8/2003 | Voights et al. ............. 360/97.02 |
| 2005/0190488 A1 | * | 9/2005 | Chan et al. ................. 360/97.02 |
| 2006/0056107 A1 | * | 3/2006 | Fukaya et al. ............. 360/97.02 |
| 2007/0002490 A1 | | 1/2007 | Suwa et al. |

FOREIGN PATENT DOCUMENTS

| | | | |
|---|---|---|---|
| JP | 54154310 A | * | 12/1979 |
| JP | 55157173 A | * | 12/1980 |
| JP | 60136980 A | * | 7/1985 |
| JP | 61073269 A | * | 4/1986 |

(Continued)

OTHER PUBLICATIONS

Lennemann, E. "Aerodynamic Aspects of Disk Files", *IBM J. Res. Development*, (Nov. 1974),480-488.
Bogy, et al., "A Numerical and Experimental Study of the Bistable-Unstable Transition in Pressurized Flexible Disk Files", *IBM J. Res. Development* vol. 23, No. 4, (Jul. 1979),437-449.

(Continued)

*Primary Examiner* — Will J Klimowicz

(57) ABSTRACT

A system and method for stabilizing air flow in a shroud to disk region in a hard disk drive are disclosed. One embodiment provides a hard disk drive having a shroud with machined aerodynamic annulus insertions thereon for stabilizing the Ekman layer of air flow at the peripheral ends of the hard disks and the shroud. The aerodynamic annulus insertions are positioned in between disk pairs at approximately 1 mm from the peripheral ends of each disk to stabilize the air flow as the disk rotate and to ensure that the air flow leaves the hard disk drive at a fixed location.

15 Claims, 8 Drawing Sheets

FOREIGN PATENT DOCUMENTS

| | | | |
|---|---|---|---|
| JP | 2000322870 A | * | 11/2000 |
| JP | 2001325785 | | 11/2001 |
| JP | 2004152373 A | * | 5/2004 |
| JP | 2005235354 | | 9/2005 |
| JP | 2006079746 A | * | 3/2006 |
| JP | 2006107732 A | * | 4/2006 |

OTHER PUBLICATIONS

Shimizu, et al., "Study of Aerodynamic Characteristics in Hard Disk Drives by Numerical Simulation", *IEEE Transactions of Magnetics*, vol. 37, No. 2, (Mar. 2001),831-836.

Mou, et al., "Evaluation of an Air Shroud for Rotating Disk Vibration Suppression", *Data Storage Institute*, (2005),1-6.

* cited by examiner

METHOD AND SYSTEM FOR PROVIDING HARD DISK SHROUDS WITH AERODYNAMIC FENCES FOR SUPPRESSING FLOW INDUCED DISK EXCITATION

TECHNICAL FIELD

The present invention relates to the field of conditioning air flow inside data storage devices, and more particularly to an improved method and system for applying flow manipulation techniques to the air flow inside a hard disk drive.

BACKGROUND ART

Hard disk drives (HDD) are used in almost all computer system operations. In fact, most computing systems are not operational without some type of hard disk drive to store the most basic computing information such as the boot operation, the operating system, the applications, and the like. In general, the hard disk drive is a device which may or may not be removable, but without which the computing system will generally not operate.

The basic hard disk drive model includes a storage disk or hard disk that spins at a designed rotational speed. An actuator arm with a suspended slider is utilized to reach out over the disk. The slider is coupled with a suspension that supports both the body of the slider and a head assembly that has a magnetic read/write transducer or head or heads for reading/writing information to or from a location on the disk. The complete head assembly, e.g., the suspension, slider, and head, is called a head gimbal assembly (HGA).

A typical HDD uses the actuator assembly to move magnetic read/write heads to the desired location on the rotating disk so as to write information to or read from the location. Within most HDDs, the magnetic read/write head is mounted on a slider. The slider generally serves to mechanically support the head and any electrical connections between the head and the rest of the disk drive. The slider is aerodynamically shaped to establish an air lubrication film in order to maintain a uniform distance from the surface of the rotating disk, thereby preventing the head from undesirably contacting the disk.

The head and arm assembly is linearly or pivotally moved utilizing a magnet/coil structure that is often called a voice coil motor (VCM). The stator of a VCM is mounted to a base plate or casting on which the spindle is also mounted. The base casting with its spindle, actuator VCM, and internal filtration system is then enclosed with a cover and seal assembly to ensure that no contaminants can enter and adversely affect the reliability of the slider flying over the disk. When current is fed to the motor, the VCM develops force or torque that is substantially proportional to the applied current. The arm acceleration is substantially proportional to the magnitude of the current. As the read/write head approaches a desired track, a reverse polarity signal is applied to the actuator, causing the signal to act as a brake, and ideally causing the read/write head to stop and settle directly over the desired track.

One of the major hard disk drive (HDD) challenges is track misregistration (TMR). TMR is the term used for measuring off track errors while a HDD writes data to and reads data from the disks. One of the major contributors to TMR is flow-induced vibration. Flow-induced vibration is caused by turbulent flow within the HDD. The nature of the flow inside a HDD is characterized by Reynolds number, which is defined as the product of a characteristic speed in the drive (such as the speed at the outer diameter of the disk), and a characteristic dimension (such as the disk diameter or, for some purposes, disk spacing), divided by the kinematic viscosity of the air. In general, the higher the Reynolds number, the greater the propensity of the flow to be turbulent.

Due to the high rotational speed of the disks and the complex geometry of the HDD components, the flow pattern inside a HDD is inherently unstable and non-uniform in space and time. The combination of flow fluctuations and component vibrations are commonly referred to as flow induced vibration fluid structure interaction, and "flutter."

A significant portion of flow induced vibration of a HDD with two or more disks is associated with the turbulent flow near the disk outer edge. Every disk surface in a HDD causes radial outflow of the air near its surface. In today's drives the thickness of this layer is typically a few tenths of millimeters near the rim of the disk. The thickness of the layer (called Ekman layer) is much smaller than the disk to disk axial clearance which is typically of the order of 1.5 to 3 mm. At the rim of the disk the Ekman layer continues in the form of a jet flow directed at the disk cylindrical enclosure (called a shroud). Near the disk/shroud region the jets on either side of the disk bend sharply over an angle of 180 degrees and dissipate. Between two disk surfaces the two jets flow together originating from a line on the disk shroud called a rear stagnation line. The jets also entrain and mix with air adjacent to the shroud.

In a majority of disk drives built today, the rear stagnation line is not stable but wobbles chaotically about the mean axial location of two adjacent co-rotating disks. The circumferential velocity of the air in the re-entrant Ekman jets is actually lower than the circumferential speed of the nearby disk surfaces. The unsteady burst-like Ekman jet chaotically injects air with low circumferential velocity which mixes with higher velocity air. The mixing process causes a Reynolds stress which tends to slow down the disks.

The unsteadiness of the Ekman jet is undesirable. It is therefore desirable to have a shroud that assures that the Ekman jet always leaves the shroud at a fixed location thereby minimizing the amount of turbulence in the HDD.

SUMMARY

In accordance with certain aspects of the present invention, the present invention provides a hard disk drive comprising a shroud wall capable of effectively stabilizing the Ekman jet flow in the hard disk drive. One embodiment of the present invention provides techniques for stabilizing the unsteadiness of the Ekman jet flow using a flow separation edge-very much like the trailing edge of an airfoil—to assure that the merged Ekman jets always leave the shroud at a fixed location.

In one embodiment, the flow conditioning solution presented in the present invention provides aerodynamic fences or splitter plates that are constructed in the shroud with each fence being inserted between a pair of disks to provide pressure variance suppression at a mid-disk monitor point of approximately 1 mm inward from the disk rim.

In one embodiment of the present invention, a plurality of thin or wide cusps are machined into the shroud to provide flow conditioning to the disk pack. The cusps allow for axial disk pack insertion as well as a shroud shape profiling operation, while reducing turbulence in the disk pack.

BEST MODE FOR CARRYING OUT THE INVENTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

The discussion will begin with an overview of a hard disk drive and components connected therewith. The discussion will then focus on embodiments of a method and system for conducting disk drive inventory in a disk drive assembly environment.

Overview

In general, the HDD comb (also referred to as an E-block) serves as a platform on which the suspensions (compliant members containing sliders with recording heads) are mounted. The recording heads fly at a constant height (on the order of nanometers) above the disk surface tracking pre-written servo information. An HDD carriage assembly (as shown in FIGS. 1A and 1B) forms the primary motive mechanical system that enables a disk-drive to randomly access data to be written or recorded on the disk surfaces.

Figure 1A:
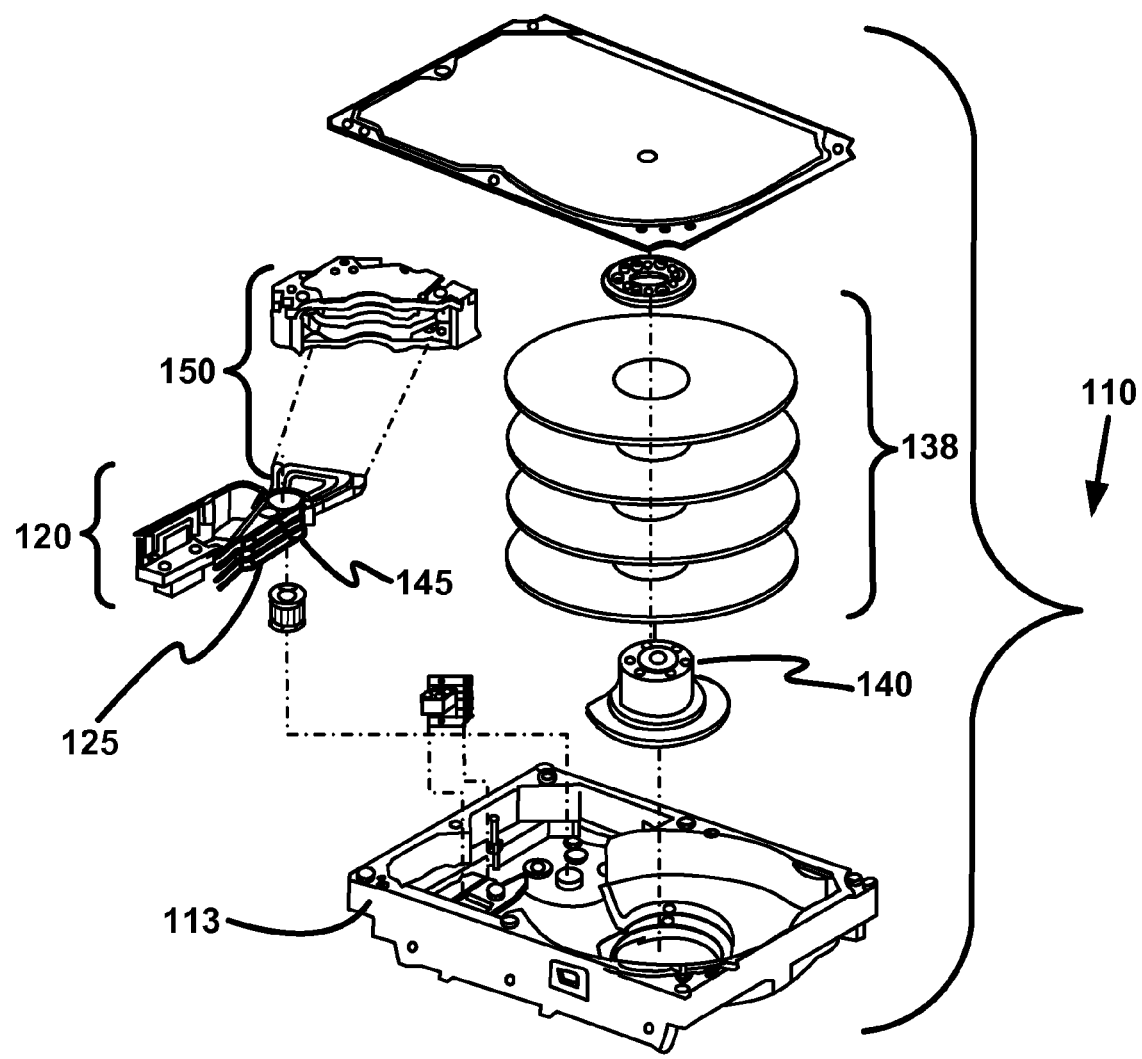
FIG. 1A is a plan view of an HDD with cover and top magnet removed with a serial identification label affixed to it in accordance with one embodiment of the present invention.
Figure 1B:
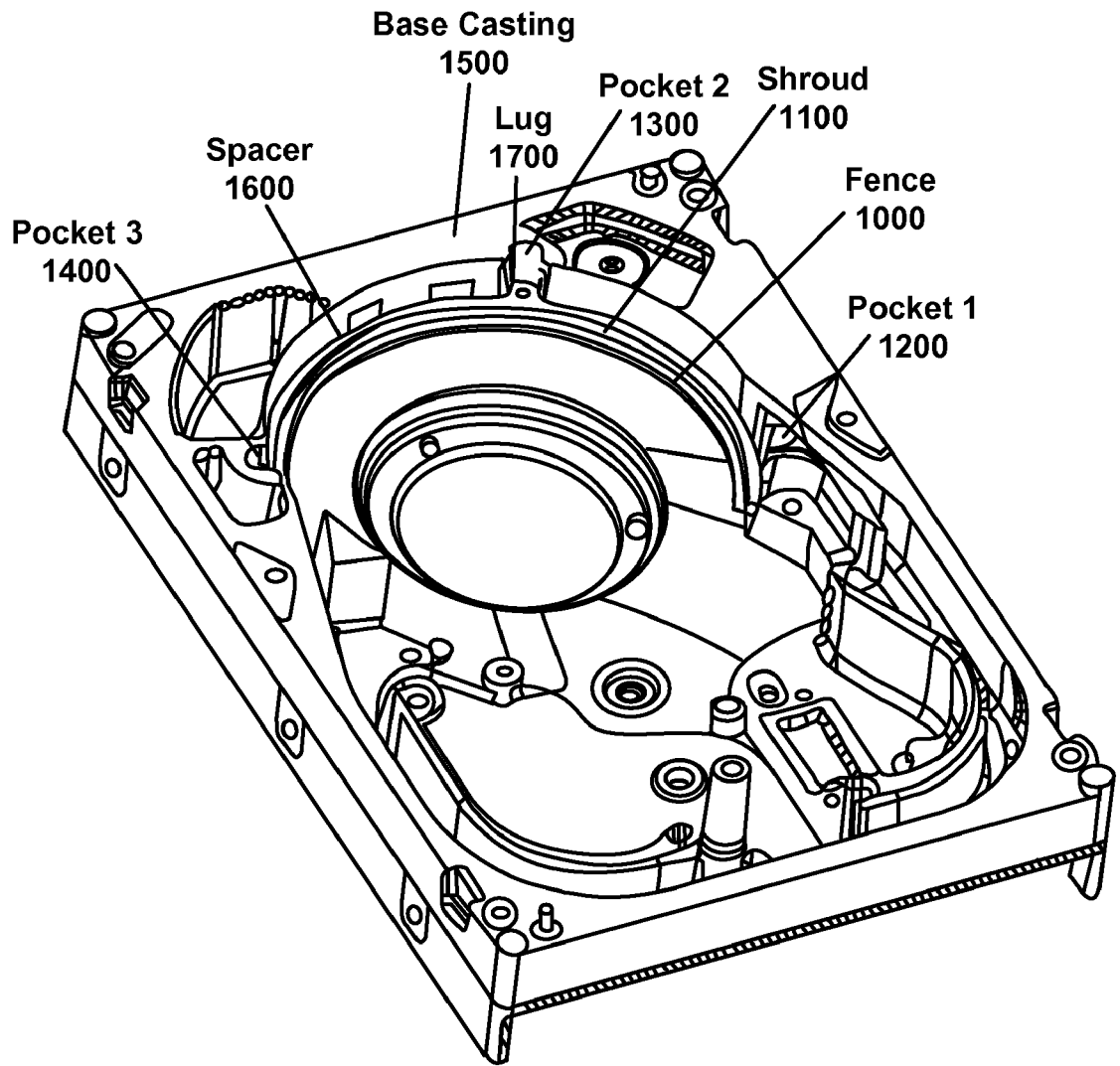
FIG. 1B is a plan view of an HDD having one embodiment of the disk shroud in accordance with one embodiment of the present invention.

With reference now to FIG. 1A a schematic drawing of one embodiment of an information storage system including a magnetic hard disk file or drive 110 for a computer system is shown. Hard disk drive 110 has an outer housing or base 113 containing a disk pack having at least one medium or magnetic disk 138. The disk pack (as represented by disk 138) defines an axis of rotation and a radial direction relative to the axis in which the disk pack is rotatable.

A spindle motor assembly having a central drive hub 140 operates as this axis and rotates the disk 138 or disks of the disk pack in the circumferential direction relative to housing 113. An actuator 120 includes a plurality of parallel actuator arms 125 in the form of a comb that is movably or pivotally mounted to base/housing 113 about a pivot assembly 145. A magnet assembly 150 is also mounted to base 113 for selectively moving the comb of arms relative to the disk pack (as represented by disk 138).

In the embodiment shown in FIG. 1A, each drive is affixed with an identification code, preferably a bar-coded label storing a unique serial number associated with the particular drive. The identification code could also include other information which an operator may be able to use to detect a drive in the manufacturing environment.

FIG. 1B is a plan view illustration of one embodiment of the disk shroud in accordance with one embodiment of the present invention. The illustration in FIG. 1B shows a base casting with a disk shroud that is built-up from alternating stacked shroud part 1100 having lugs 1700. The lugs have holes for fastening into the base casting. For clarity the fastening screws are not shown. Next to each shroud part 1100 is a fence part 1000 that has the same plan form as the shroud part. For a disk drive with four disks, three shroud and fence parts are needed. The lugs 1700 line up with pockets shown in FIG. 1B. Disk and shroud, fence pairs are stacked in alternating fashion. Disks are spaced with spacer rings such that after stacking, one fence ends up between two disk surfaces. For clarity the disks and the disk spacers are not shown.

Figure 2:
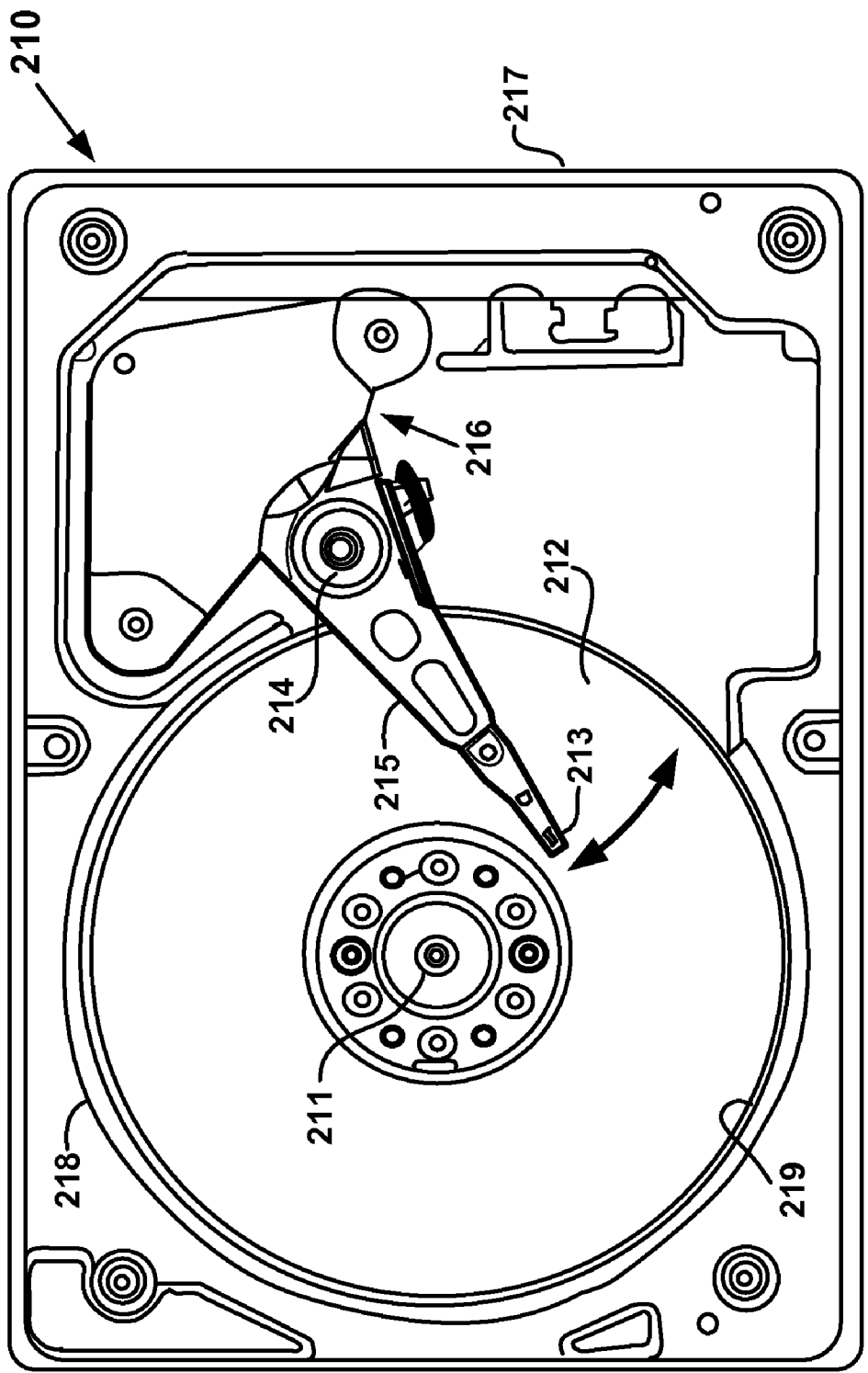
FIG. 2 is a plan view of an HDD having a clearance shroud in accordance with one embodiment of the present invention.

Referring now to FIG. 2 is plan view diagram of an HDD having a shroud with aerodynamic fence in accordance with one embodiment of the present invention. The HDD 210 comprises a plurality of magnetic recording disks 212 capable of rotating about a support axis 211 and corresponding flying head sliders 213 opposed to the front and back surfaces of the respective magnetic recording disks 213. A shroud 219 is inserted into an enclosure 218 enclosing the magnetic recording disks 212. The shroud 219 is designed to define a shroud wall surrounding the magnetic disks 212. The shroud wall is spaced from the peripheral ends of the disks 212. In one embodiment of the present invention, the shroud 219 provides a stabilizing effect to the flow field near the disk to shroud clearance using a fence on the shroud 219 which is placed centrally between two disk surfaces. The shroud 219 is constructed in a way according to the teachings of the present invention to reduce vibration turbulence in the disks 212 by stabilizing the layer of air flow at the junction of the shroud 219 and the peripheral ends of the disks 212.

Figure 3:
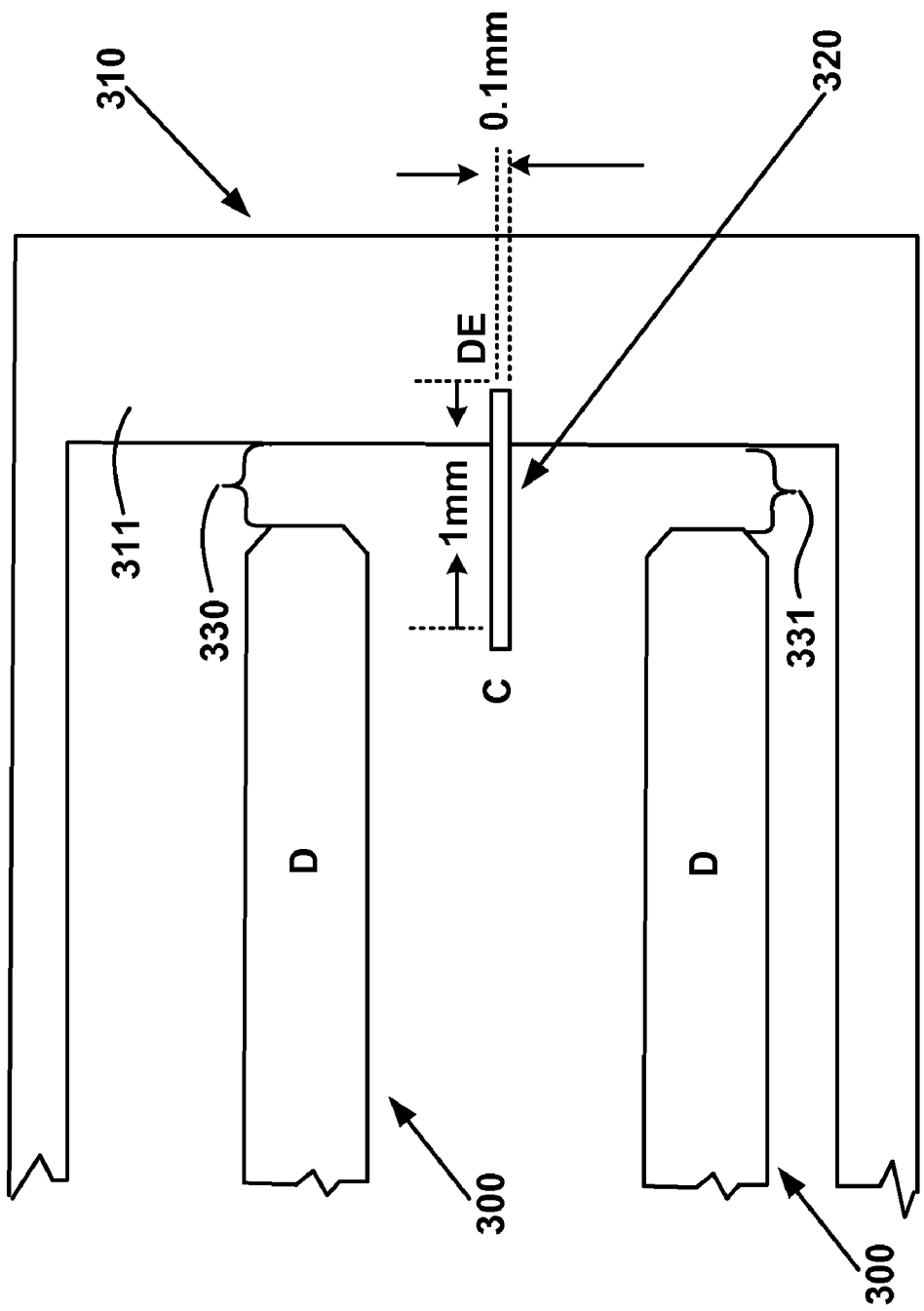
FIG. 3 is a cross section view illustrating one embodiment of a shroud having a thin aerodynamic fence formed in the disk shroud schematic in accordance with one embodiment of the present invention.

FIG. 3 is a cross sectional illustration of one embodiment of the air flow conditioning device of the present invention. As shown in FIG. 3, the device comprises a plurality of disks 300, shroud 310 and a plurality of aerodynamic fences or splitter plates 320.

In one embodiment, the plurality of the aerodynamic fences or splitter plates 320 are constructed as thin annular insertions between disk pairs machined into the shroud 310. In one embodiment, the aerodynamic fences 320 are constructed as thin annuli which are tangentially inserted into the shroud 310. The shroud 310 could also receive the plurality of thin fences 320 into a thin circumferential slot in the shroud and the fences could be tensioned into grooves in the shroud 310 by suitable initial shaping like a C-ring.

In one embodiment, the aerodynamic fences 320 have a radial extent of the order of half the disk to disk clearance while having a thin (e.g., <0.1 mm wide) trailing edges. The aerodynamic fences 320 suppress pressure variances at a mid-disk monitor point (e.g., 2 mm) inward from each disk rim of the plurality of disks 300. In one embodiment, the aerodynamic fence or splitter plate 320 is approximately 1 mm long and approximately 0.1 mm thick.

In one embodiment of the present invention, when the spindle motor generates a drive torque, the torque causes the disks 300 to rotate. The disks 300 could reach a rotation velocity of about 15,000 rpm. As the disks 300 rotate, a Ekman jet (layer of air flow) is formed at the junction 330 and 331 between the peripheral of the disks 300 and the clearance 311 of the shroud 310.

The aerodynamic fence 320 stabilizes the flow field near the disks 300 to shroud 310 clearance 330 and 331 by directing the air flow away from the peripheral ends of the disks 300 thereby ensuring that the air flow leaves the device at a fixed location.

In one embodiment of the air flow stabilizing method of the present invention, a plurality of disk drives is provided with an enclosure 310. The enclosure 310 comprises a clearance 311 with the plurality of disks 300 so arranged that the peripheral ends of the plurality of disks oppose the clearance 311. A radially inward return flow is formed at the junction of the clearance 311 and the peripheral ends of the disks 300. The method further comprises positioning a plurality of air flow stabilizing insertions 320 on the clearance 311 with each air stabilizing insertion 320 extending in-between a disk pair 300. The air flow stabilizing insertions 320 stabilize the air jet at the peripheral ends of the disk 300 and ensures that the jet of air leaves the enclosure at a fixed location; thereby reducing vibration turbulence on the disks. In one embodiment of the present invention, the air flow stabilizing insertions extend from the shroud inward from the peripheral end of a disk to about approximately 1 mm.

Figure 4:
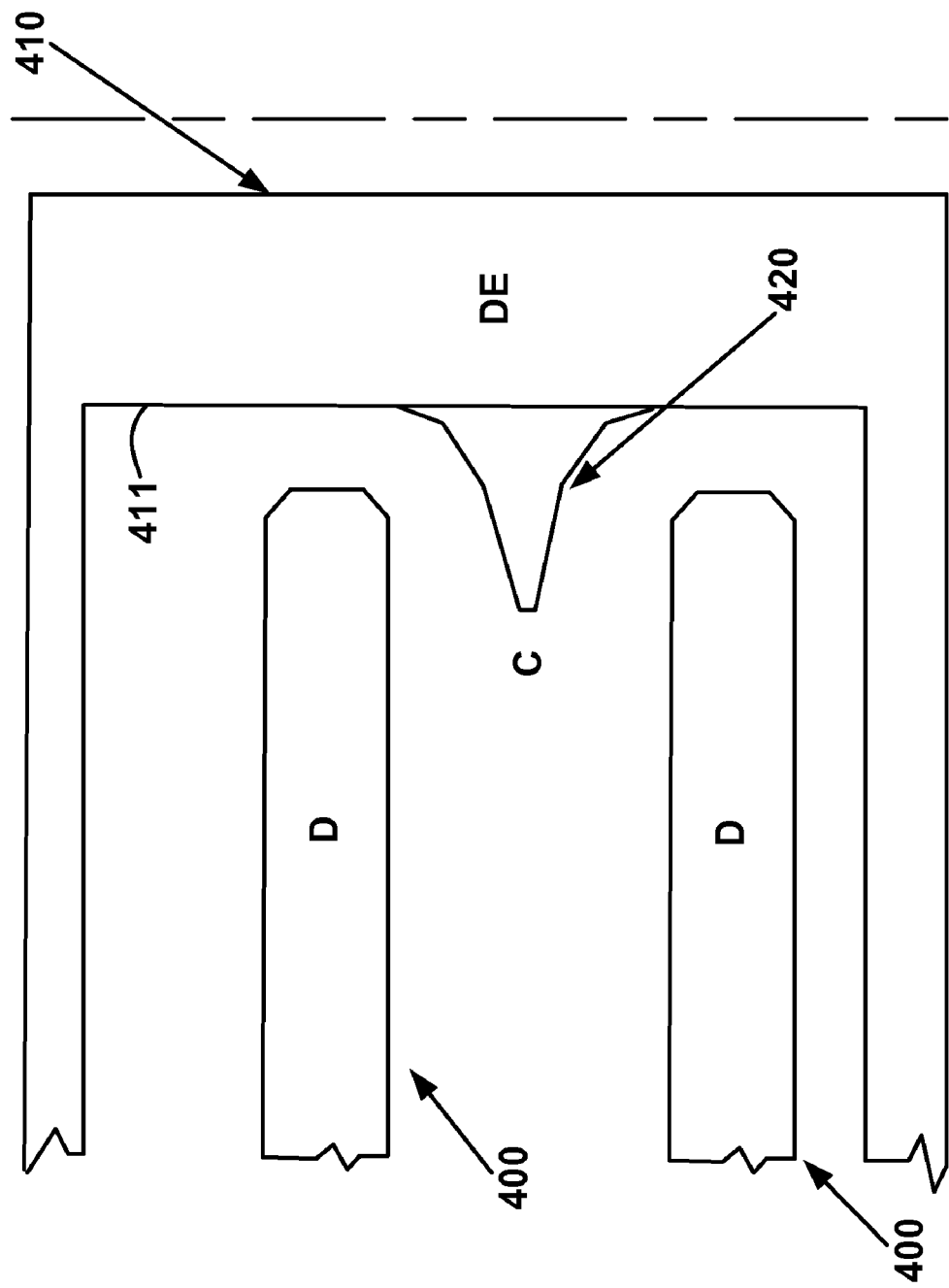
FIG. 4 is a cross section view illustrating one embodiment of a shroud having a wide cusp formed in the disk shroud schematic in accordance with one embodiment of the present invention.

FIG. 4 is a cross-sectional illustration of one embodiment of the flow control device for stabilizing air flow in disk drives is shown. As shown in FIG. 4 the shroud 410 comprises a shroud wall 411 and the aerodynamic fence or splitter plate 420. Although only one aerodynamic fence is shown in FIG. 4, the present invention contemplates the shroud wall 411 having a plurality of aerodynamic fences 420 constructed thereon to be inserted between disk pairs 400. The aerodynamic fence 420 illustrated in FIG. 4 has a different profile than the aerodynamic fence 320 illustrated in FIG. 3 but provides the same air flow suppression.

Figure 5:
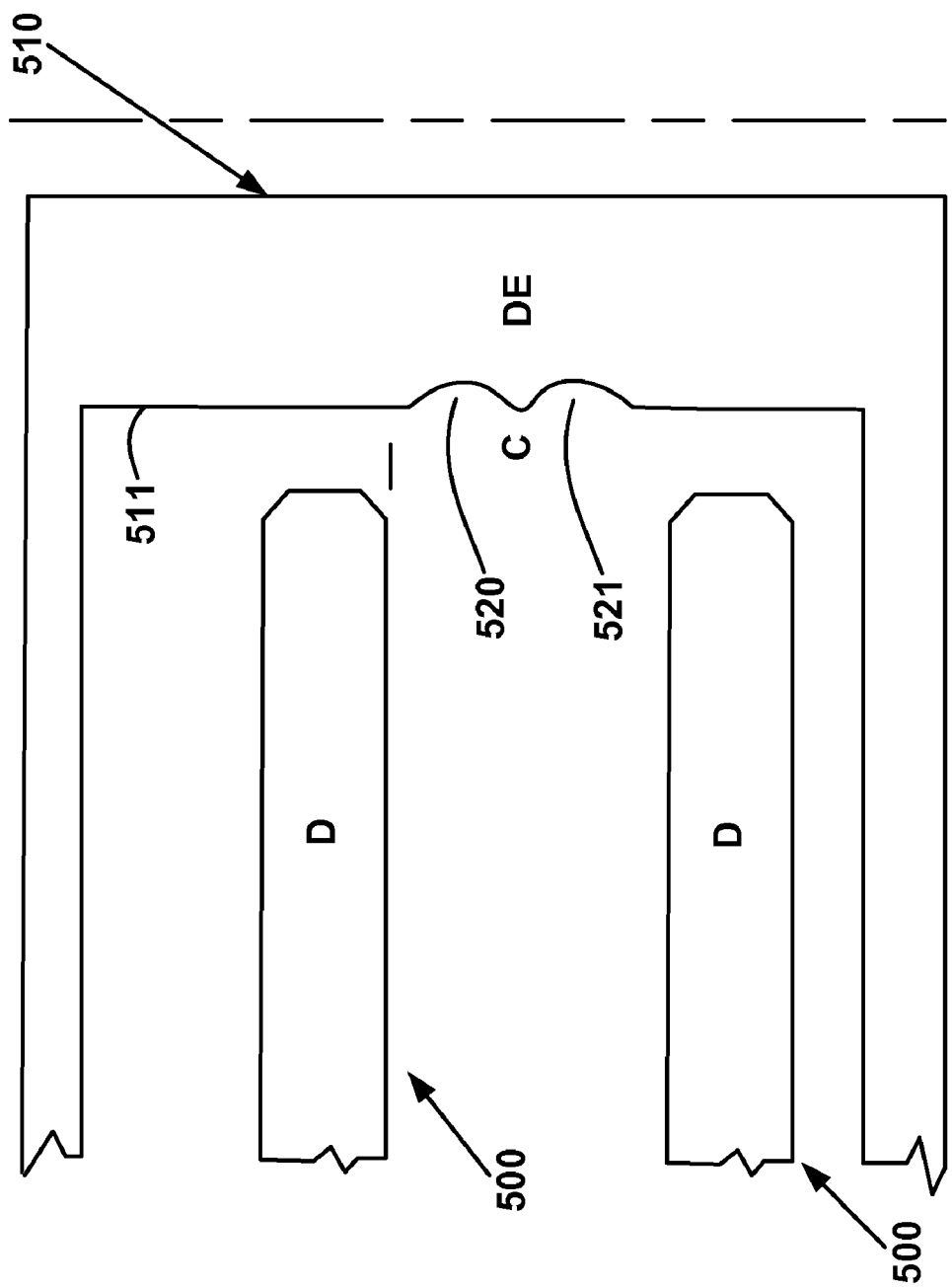
FIG. 5 is a cross section view illustrating one embodiment of a shroud having a shallow cusp in accordance with one embodiment of the present invention.
Figure 6:
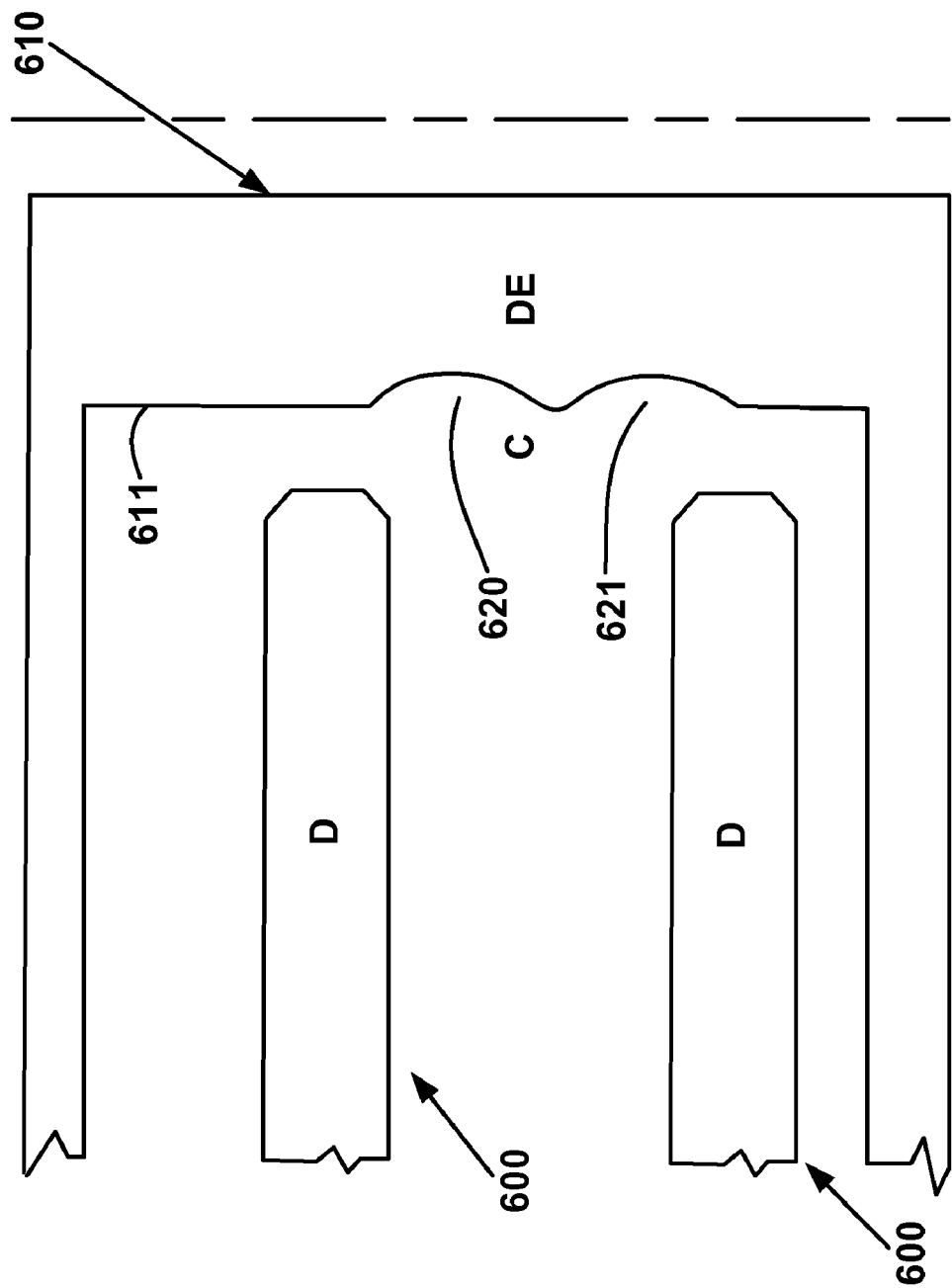
FIG. 6 is a cross section view illustrating one embodiment of a shroud having a wide cusp formed in the disk shroud in accordance with one embodiment of the present invention.

FIG. 5 and FIG. 6 are cross-sectional illustrations of another embodiment of the present invention. In the embodiments illustrated in FIGS. 5 and 6, a plurality of round circular grooves 520, 521, 620 and 621 are constructed in the shroud 510 and 610 respectively to allow axial disk pack insertion as well as a shroud profiling of having a single trailing edge centrally located between adjacent disks. The embodiment in FIG. 5 has the grooves 520 and 521 narrower while the embodiment illustrated in FIG. 6 has a wide profile cusps 620 and 621. In both embodiments, the grooves come together in a cusp.

Figure 7:
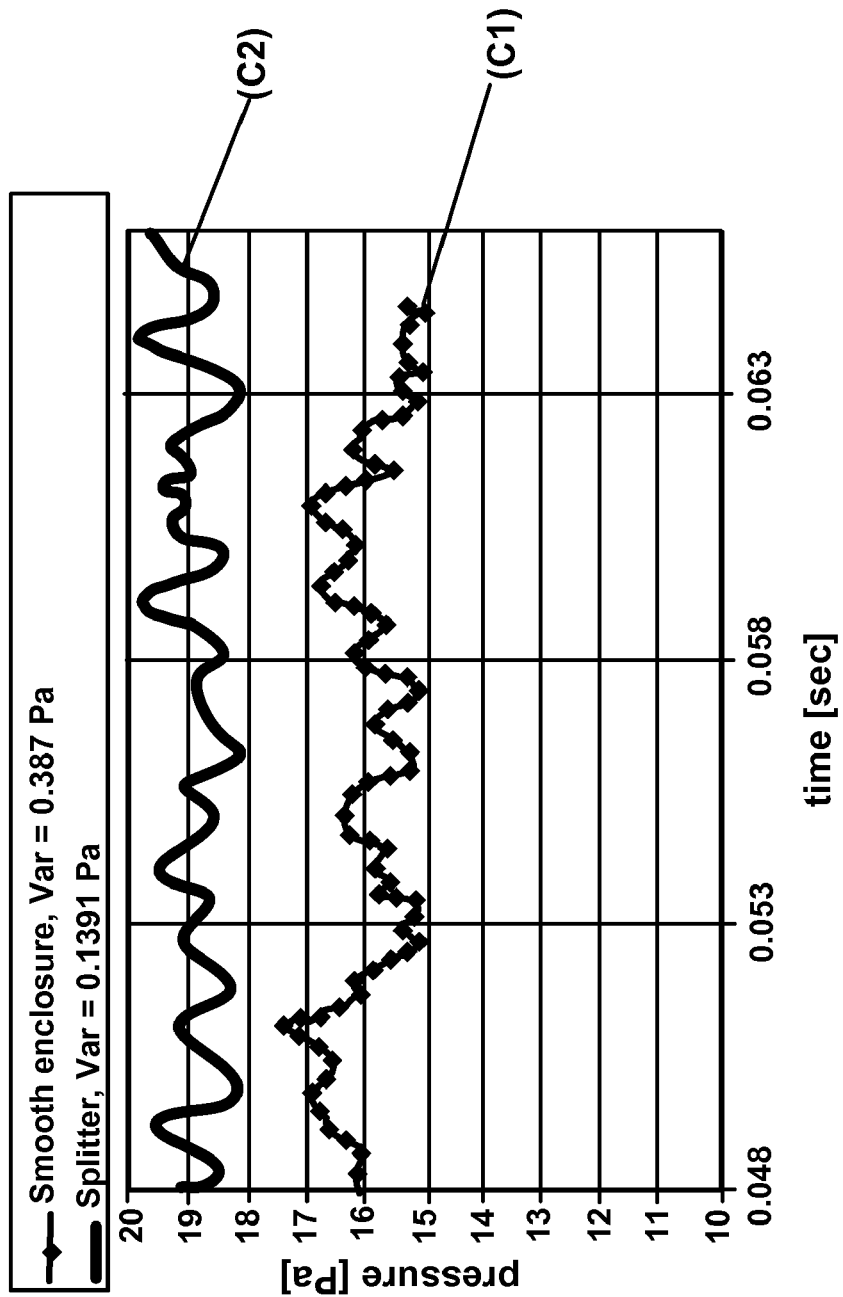
FIG. 7 is a graph illustrating the relationship between the pressure fluctuations and the time of fluctuation in a HDD in accordance with one embodiment of the present invention

FIG. 7 is a graphical illustration of the relation between the pressure asserted by the flow reduction device of the present invention and the time over which such pressure suppression occurs. In the example illustrated in FIG. 7, the pressure versus time traces is computed for two shrouded disks in the following configurations: 1) a cylindrical, smooth enclosure as depicted by the curve (C1); and 2) a cylindrical enclosure with a air flow stabilizing insertion of one embodiment of the present invention as depicted by the curve (C2).

As shown in FIG. 7, the air flow stabilizing insertion suppress pressure variance on the disks as depicted by the relative smoothness of the curve (C2) in comparison to curve (C1). In one embodiment of the present invention, the pressure variance at a mid-disk monitor point 1 mm inward from the disk rims are suppressed by a factor of approximately three.

Thus, embodiments of the present invention provide a method and apparatus for stabilizing interfering Ekman air flow layers at the disk to shroud region in a hard disk drive to reduce vibration turbulence of the disk pack. Furthermore, a low cost-effective way to construct the trailing edges of air flow stabilizing devices in a hard disk drive enclosure is achieved.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A hard disk drive comprising:
   a plurality of disks;
   an air flow conditioning device disposed in the hard disk drive to cover the plurality of disks while being spaced from the peripheral ends of each of the plurality of disks; and
   a plurality of aerodynamic annuli coupled to the air flow conditioning device, the plurality of aerodynamic annuli disposed between opposing ends of the peripheral ends of the plurality of disks between disk pairs, wherein said air flow conditioning device comprises a plurality of circumferential slots, each for receiving one of said plurality of aerodynamic annuli and wherein each of said plurality of circumferential slots provide a tensile force to retain each of said aerodynamic annuli within said plurality of circumferential slots.

2. The hard disk drive of claim 1, wherein the air flow conditioning device is a shroud.

3. The hard disk drive of claim 2, wherein a layer of air flow is formed at the junction between the peripheral ends of the plurality of the disks and the shroud.

4. The hard disk drive of claim 3, wherein the shroud controls the layer of air flow to control air flow vibration turbulence on the plurality of disks.

5. The hard disk drive of claim 4, wherein the plurality of aerodynamic annuli stabilizes the layer of air flow at the junction between the peripheral ends of the plurality of disks and the shroud.

6. The hard disk drive of claim 5, wherein the aerodynamic annuli provides a flow conditioning to ensure that the layer of air flow leaves the hard disk drive at a fixed location.

7. The hard disk drive of claim 6, wherein the plurality of aerodynamic annuli suppresses the air flow layer at a pressure variance at a mid-disk monitor point of approximately 1 mm inward from the peripheral ends of the plurality of disks by a factor of three.

8. A data storage device, comprising:
   a plurality of disks;
   a disk enclosure enclosing the plurality of disks;
   an enclosure wall coupled to the disk enclosure opposing the peripheral ends of each of the plurality of disks, wherein a layer of air flow is formed at the junction of the enclosure wall and the peripheral ends of the plurality of disks; and
   a plurality of air flow stabilizing insertions coupled to the enclosure wall forming a fence-like structure on the enclosure wall, each of the air flow stabilizing insertions disposed between a disk pair at the peripheral ends of the disk pair opposing the enclosure wall, wherein said enclosure wall comprises a plurality of circumferential slots, each for receiving one of said plurality of air flow stabilizing insertions and wherein each of said plurality of circumferential slots provide a tensile force to retain each of said air flow stabilizing insertions within said plurality of circumferential slots.

9. The data storage device of claim 8, wherein the plurality of air flow stabilizing insertions stabilizes the layer of air flow at the junction of the peripheral ends of the plurality of disks and the enclosure wall to reduce vibration turbulence on the plurality of disks.

10. The data storage device of claim 9, wherein the layer of air flow is an Ekman jet.

11. The data storage device of claim 10, wherein the enclosure wall is a shroud.

12. A method of stabilizing air flow in a hard disk drive, comprising:
providing a plurality of hard disks;
providing a shroud enclosure enclosing the plurality of hard disks, wherein said shroud enclosure comprises a plurality of circumferential slots; and
forming a plurality of aerodynamic annulus insertions on the shroud enclosure to stabilize air flow at the junction of the shroud enclosure and peripheral ends of the plurality of the hard disks, each of said plurality of circumferential slots for receiving one of said aerodynamic annulus insertions and wherein each of said plurality of circumferential slots provide a tensile force to retain each of said aerodynamic annulus insertions within said plurality of circumferential slots.

13. The method of claim 12, wherein each of the plurality of aerodynamic annulus insertions is positioned in between disk pairs in the plurality of hard disks approximately 1 mm inward from a boundary layer of the shroud enclosure towards the rotational axis of the plurality of hard disks.

14. The method of claim 13, wherein the plurality of aerodynamic annulus insertions suppresses the air flow layer at a pressure variance at a mid-disk monitor point of approximately 1 mm inward from the peripheral ends of the plurality of disks by a factor of three.

15. The method of claim 14, wherein the air flow is an Ekman air flow layer.

* * * * *